United States Patent [19]
Lindsey, Jr.

[11] 3,727,342
[45] Apr. 17, 1973

[54] ICE FISHING TIP-UP APPARATUS

[76] Inventor: John L. Lindsey, Jr., 1804 Evans Street, Omaha, Nebr. 68110

[22] Filed: June 30, 1971

[21] Appl. No.: 158,275

[52] U.S. Cl. .................................................. 43/17
[51] Int. Cl. ........................................... A01k 97/12
[58] Field of Search ..................................... 43/17

[56] References Cited

UNITED STATES PATENTS

| | | | |
|---|---|---|---|
| 3,060,616 | 10/1962 | Woodley | 43/17 |
| 2,136,864 | 11/1938 | Paquette | 43/17 |
| 2,496,090 | 1/1950 | Grohs | 43/17 |
| 2,732,649 | 1/1956 | Tuttle | 43/17 |
| 3,187,456 | 6/1965 | Apitz | 43/17 |

*Primary Examiner*—Robert Peshock
*Assistant Examiner*—Daniel J. Leach
*Attorney*—George R. Nimmer

[57] ABSTRACT

An ice fishing tip-up apparatus wherein a fishing line is suspendable from a forward position of an elongate pivotal lever, the lever at its fulcrum medial portion being pivotably attached at a fixed location to an upright member. The lever forward-arm is provided with a loosely surrounded slidable weight having a rearward limit of travel at which the lever is caused to assume a first-stable or "ready" condition, the slidable weight being forwardly incrementally urged along the lever forward-arm during downward tugs on the fishing line whereupon the lever is thereby caused to assume a second-stable or "tipped" condition, which can be readily returned by the operator to the first-stable condition. The apparatus can be made to be of variable sensitivity and can be structurally made to an exceedingly compact form for interim storage purposes.

4 Claims, 4 Drawing Figures

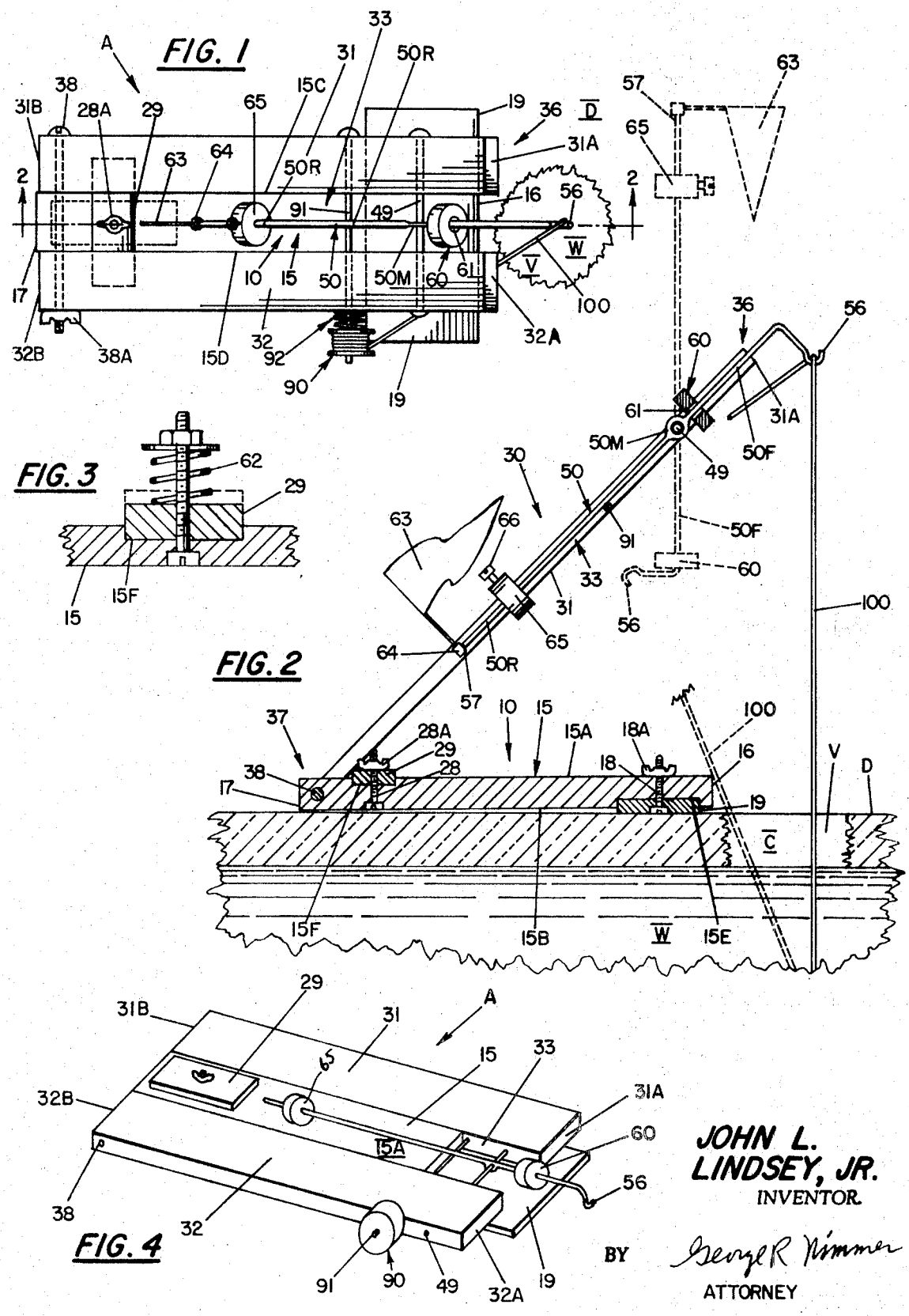

ICE FISHING TIP-UP APPARATUS

The general concept of ice fishing tip-up apparatus is well known in the prior art, as typified by U.S. Pat. No. 3,190,026 (Roszak-June 22, 1965). Such apparatus including a suspended fishing line is positioned upon the ice-crust of a frozen body of water, immediately adjacent to a vertical opening through the ice-crust. In this manner, a fisherman at a remote sheltered location might keep a plurality of such apparatus under surveillance. However, the prior art apparatus are difficult to erect and to "set" into ready condition i.e., so as to be receptive to game fish. Such prior art devices also tend to be of cumbersome and expensive construction, difficult to erect and to transport from one location to another, inimicably affected by frigid and moist ambient conditions, and not reliably suited to the intended purpose.

It is accordingly the general object of the present invention to provide an ice fishing tip-up apparatus that overcomes the several objections and disadvantages associated with prior art structures.

It is a specific object of the present invention to provide an ice fishing tip-up apparatus that is exceedingly compact in the pre-erected collapsed form, and that is readily portable and that can be easily and quickly erected into operational condition.

It is another object to provide an ice fishing device that is not inimicably affected by hydrous and frigid weather conditions.

It is a further object to provide an ice fishing device that can be reliably and quickly set or re-set to a "ready" condition during extended operations thereof, and that is of exceedingly operational reliability for a variety of intended purposes.

It is another object to provide an ice fishing device that is of economical and reliable manufacture and construction, and that is amenable to a variety of encountered situations.

With the above and other objects and advantages in view, which will become more apparent as this description proceeds, the ice fishing tip-up apparatus of the present invention generally comprises a base member adapted to support said apparatus adjacent to a vertical opening through a laminar ice-crust, an upright member preferably collapsibly attached to the base member and extendable uprightly therefrom, an elongate lever member including a medial-portion pivotably attached to a forward portion of the upright member with a lever-pivot and also including a lever forward-arm and a lever rearward-arm, a slidable-weight on the lever forward-arm and having a rearward limit of travel whereby the lever is thereby made to assume a first-stable condition wherein a fishing line suspended from the forward-arm remains indefinitely ready for a downward pull by a game fish located below the ice-crust, said slidable-weight being freely continuously slidably movable along the lever forward-arm forwardly from its rearward limit of travel during a pronounced downward movement of the forward-arm (as initiatable by downward tugs on the fishing line by a game fish) whereby the lever is made to assume a downwardly tipped second-stable condition.

In the drawing, wherein like characters refer to like parts in the several views, and in which:

FIG. 1 is a top plan view of a representative embodiment of the ice fishing tip-up apparatus of the present invention.

FIG. 2 is a sectional elevational view taken along line 2—2 of FIG. 1.

FIG. 3 is a detail sectional elevational view of an alternate means for securing base member components.

FIG. 4 is a perspective view of the FIGS. 1 and 2 embodiment, shown in the downwardly collapsed form, as for purposes of interim storage.

Referring initially to FIGS. 1 and 2, the ice fishing tip-up apparatus "A" is utilized immediately adjacent to a vertical opening "V" through the laminar horizontal ice-crust "C" of a frozen lake (of other suitable frigid body of water) thereby providing access with fishing line 100 to game fish swimming in liquid water "W" beneath ice-crust "C." Ice fishing apparatus "A" generally comprises a base member 10 adapted to support apparatus "A" at ice-crust "C" immediately adjacent to opening "V," an upright member 30 extendable uprightly from base member 10, an elongate lever 50 pivotably attached to upright member 30, said lever having two stable conditions afforded through a slidable-weight 60 on the lever forward-arm 50F including the "ready" first-stable condition indicated in solid line in FIGS. 1 and 2 and the "tipped" second-stable condition indicated in phantom line in FIG. 2.

Base member 10 stably rests upon the upper surface "D" of ice-crust "C" and has a front end e.g., base-member frontal-end 16 positioned immediately adjacent to ice-crust opening "V," base member 10 extending lengthwise rearwardly from its front end toward the base member rear end. For purposes of stabilizing the lofty apparatus "A" with respect to the ice-crust "C," base member 10 has an appreciable overall transverse width. For example, as seen in the FIG. 1 top plan view, the base member of the erected apparatus "A" herein has a generally T-shaped configuration as afforded by an elongate base-plate 19, a central portion of base-plate 19 being pivotably attached to a forward portion of base-bar 15 (as with vertical screw 18). Base-bar 15 is preferably of regular cross-sectional shape and size along the length 16–17 thereof. The herein cross-sectionally rectangular base-bar 15 has four planar elongate surfaces including upper surface 15A, lower surface 15B, leftward surface 15C, and rightward surface 15D. Base-bar 15 also has the frontal-end 16 and the rear-end 17. There are means to releaseably maintain a selected angular relationship between base-bar 15 and base-plate 19, as by means of wing-nut 18A threadedly engaged with screw 18 and downwardly bearable against base-bar upper surface 15A. Thus, base-plate 19 can be extended lengthwise transversely of base-bar 15 when the apparatus "A" is erected as in FIGS. 1 and 2; in this vein, the base-bar lower side 15B can be provided with transverse groove 15E.

The apparatus' upright member 30 has a rearward end 37, and has a forward end 36 positioned nearer to ice-crust vertical opening "V" and located loftily above the base member forward portion e.g., 16, 19. Herein, the rearward portion of the elongate oblique upright member 30 is pivotably attached to the rearward portion of base member 10, as with a screw 38 transversely passing through base-bar 15 whereby upright member 30 is extendable obliquely upwardly and forwardly of the base member rearward end 17. Wingnut 38A threadedly engaged with screw 38 and bearable against upright member 30 provides a means for maintaining the selected angularity between base member 10 and upright member 30. Upright member 30 herein comprises a pair of substantially parallel elongate rails including a leftward rail 31 that is transversely spaced from a rightward rail 32. The transverse spacing 33 between rails 31 and 32 is preferably at least equal to the regular transverse width 15C–15D of the base-bar 15. Each of the rails 31 and 32 shown is of regular cross-sectional size and shape along the length thereof, and herein of a cross-sectional height like that for base-bar 15 as indicated in FIG. 4. Moreover, each of the lineal rails 31 and 32 is of substantially equal length whereby the rails' transversely aligned forward extremities 31A and 32A provide the upright member forward end 36 while the rails' transversely aligned rearward extremities 31B and 32B provide the upright member rearward end 37. It can be seen that the respective rails 31 and 32 are located along the opposite transverse sides 15C and 15D of base-bar 15.

There are herein means to automatically establish a desired angular relationship between the base member base-bar 15 and the obliquely forwardly-upwardly extending linearly elongate upright member 30. For example, there is an elongate rectangular lug-plate 29, a central portion of which is pivotally attached to a rearward portion of base-bar 15 (as with vertical screw 28). Thus, lug-plate 29 can be extended lengthwise transversely of base-bar 15 to contact the underside of both rails 31 and 32 near pivot 38 to automatically establish the desired angular relationship between members 10 and 30. In this vein, the base-bar upper side 15C can be provided with a transverse groove 15F. The transverse width of lug-plate 29 is less than the transverse spacing 33 between rails 31 and 32, as indicated in phantom line in FIG. 1 and also as in FIG. 4.

The elongate upright member also carries a supply of fishing line 100, herein as reel 90 revolvably attached transversely alongside rail 32 and transversely remote of the inter-rails gap 33. Herein, the revolvable attachment between reel 90 and the upright member 30 is with a shaft 91 attached to rail 32. A coil spring means 92 surrounds shaft 91 between rail 32 and reel 90 to provide tension on said reel. As will be described later in greater detail, the upright member carries a forward-restraint for the apparatus' lever rearward-arm; the forward-restraint might take the form of shaft 91 extending from rail 32 toward rail 31, and even affirmatively attached to rail 31. The forward-restraint as shaft 91 is positioned a distance from pivot 38 which exceeds base-bar length 16–17.

Lever member 50 has a medial-portion 50M pivotably attached to a forward portion of upright member 30, as with a lever-pivot 49, to provide a fixedly located fulcrum 49 for the elongate lever 50. Herein, the lever medial-portion 50M is located between the upright member rails 31 and 32 immediately rearwardly of the upright member front end 36. The lever-pivot 49 is herein secured to one rail and extends transversely therefrom toward the other rail and through a circular aperture of the lever medial-portion 50M. Elongate lever 50 includes a rearward-arm 50R and a forward-arm 50F extending in opposite directions from the lever-pivot fulcrum 49, forward-arm 50F forwardly remote of lever-pivot 49 including a suitable fishing line suspension means e.g., hooked portion 56. The rearward-arm 50R of pivotably attached lever 50 is forwardly bearable against the forward-restraint e.g., 91, carried by the apparatus upright member. Herein, the entire lever 50 is provided of a single length of rigid metallic rod stock extending linearly forwardly from rearward-arm rearward end 57 to the forward-arm hooked portion 56. The circularly cross-sectioned rod stock is suitably swedged or flattened at medial-portion 50M to accommodate lever-pivot 49.

There is a slidable-weight 60 slidably positionable along lever forward-arm 50F. Slidable-weight 60 has a rearward limit of travel along 50F e.g., at 50M, at which the slidable-weight moment causes the lever rearward-arm 50R to contact the forward-restraint 91 whereby the lever is made to assume a first-stable or "ready" condition, as indicated in solid line in FIGS. 1 and 2. Herein, for said solid line first-stable "ready" condition, for lever 50, the rearward-arm 50R and the forward-arm 50F are located between rails 31 and 32, the forward-arm hooked forward extremity 56 is located forwardly of the upright member forward end 36 and loftily above the ice-crust opening "V," and the forward-arm 50F at the rearwardly stationed slidable-weight 60 extends upwardly and forwardly of lever-pivot 49. Fishing line 100 extends upwardly-forwardly from reel 90 to lever hooked portion 56 and is thus suspended downwardly therefrom through ice-crust opening "V" into water "W" whereby the suspended fishing line remains indefinitely "ready" at the lever first-stable condition to be receptive to downward pulls by a game fish located in the water below ice-crust "C." However, upon the application of downward forces to lever forward-arm 50F (as initiatable by downward tugs on the suspended fishing line 100 by a game fish), such that the forward-arm 50F at the slidable-weight rearward station moves downwardly below horizontal condition, slidable-weight 60 moves abruptly forwardly of its rearward limit of travel (50M); the moment of the forwardly moved slidable-weight causes the lever 50 to assume a "tipped" second-stable condition (indicated in phantom line in FIG. 2). At such second-stable condition, the lever rearward-arm 50R becomes stably situated remote of the forward-restraint 91, the lever forward-arm 50F (having slidable-weight 60 now at hooked portion 56) is tipped stably downwardly, and the fishing line 100 is herein released from the hooked portion 56. After the operator retrieves fishing line 100 from water "W" as by reel 90, the lever 50 can be simply returned to the first-stable condition by moving slidable-weight 60 rearwardly along forward-arm 50F to its rearward station e.g., at 50M, and the fishing line 100 can be resuspended from hooked portion 56.

Slidable-weight 60 is herein provided with a circular aperture 61 therethrough whereby slidable-weight 60 slidably surrounds the lever forward-arm 50F. The diameter of aperture 61 is preferably at least twice that for the constant circular diameter of lever forward-arm 50F whereby slidable-weight 60 loosely slidably surrounds lever forward-arm 50F thereby minimizing the possibility that freezing water possibly present on forward-arm 50F might immobilize the slidable-weight. Lever rearward-arm 50R might carry a flag or banner 63 thereon to give better visual indication to a remotely stationed operator that lever 50 had attained the second-stable "tipped" condition. Herein, banner 63 includes a hubbed portion 64 to permit removable attachment to lever rearward end 57. Lever 50 might carry a counterbalance-weight 65 fixedly positionable along rearward-arm 50R (as by set screw 66) whereby said counterbalance-weight 65 remains at said selected location during both stable conditions for lever 50. The counterbalance 65 provides a means for varying the sensitivity of apparatus "A," although the same result is attainable less desirably through varying the gravimetric mass for slidable-weight 60.

FIG. 4 indicates the exceedingly compact downwardly collapsed form for erectable apparatus "A," having been attained by pivoting rails 31 and 32 at 38 to bring them into a co-planar relationship with base-bar 15, accompanied by a 90° pivoting of base-plate 19 and lug-plate 29. Although the FIG. 4 compact form is attainable through wing-nut fasteners 18A and 28A, these fasteners can be dispensed with as alluded to in FIG. 3. Specifically, instead of the wing-nut 28A on screw 28, a helical spring 62 (analogous to helical spring 92) might surround screw 28, between a suitable washer and the lug-plate 29, thereby resiliently urging pivotable lug-plate 29 toward base-bar 15 as indicated in phantom line in FIG. 3. An analagous helical spring (not shown) might be employed to resiliently urge base-plate 19 upwardly toward base-bar 15.

From the foregoing, the construction and operation of the ice fishing apparatus will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. An ice fishing tip-up apparatus comprising:

A base member adapted to support said apparatus at a substantially horizontal laminar ice-crust and adjacent to a vertical opening through said ice-crust, said base member comprising an elongate horizontal base-bar having a frontal-end and a rear-end;

An upright member comprising a pair of substantially parallel rails located on opposite transverse sides of the base-bar, the rearward portions of said rails and intervening base-bar being pivotably attached whereby the dual-rails upright member is of selectable angularity with and also downwardly collapsible alongside said base-bar, each of said parallel rails having a free forward-end positioned forwardly of the base-bar frontal-end when the pivotal rails are in downwardly horizontally collapsed condition, said upright member forwardly of its pivotal connection to the base-bar being provided with a forward-restraint means extending transversely from one of said parallel rails to the other rail; and An elongate lever, a lever medial-portion being pivotably attached to the dual-rails upright member at a lever-pivot located between the rails to provide a fixedly positioned fulcrum for said lever, said lever including a rearward-arm and an elongate forward-arm extending in substantially opposite directions from the lever-pivot fulcrum, the lever rearward-arm being bearable against the forward-restraint, the lever elongate forward-arm forwardly remote of said fulcrum including fishing line suspension means positionable above the ice-crust opening, said lever elongate forward-arm also including a slidable-weight freely slidable therealong and having a rearward station at which the slidable-weight moment causes the lever rearward-arm to bear against the forward-restraint whereby the lever is made to assume a first-stable condition wherein the suspended fishing line remains ready indefinitely for a downward pull by a gamefish located below the ice-crust and wherein the forward-arm extends upwardly and forwardly from the lever-pivot, said slidable-weight being freely forwardly continuously slidable along the lever forward-arm when the forward-arm has become lower than horizontal as initiated by downward tugs on the fishing line whereby the forwardly movable slidable-weight is adapted to make the lever assume a tipped second-stable condition wherein the rearward-arm is stably situated upwardly remote from the forward-restraint and the forward-arm has become tipped stably downwardly.

2. The fishing apparatus of claim 1 wherein the base member also includes an elongate base-plate located below the base-bar and pivotably attached to the forward portion thereof whereby the base-plate is extendable lengthwise transversely of the base-bar to stabilize the erected fishing apparatus upon the ice-crust and whereby the base-plate is alternatively extendable lengthwise along the base-bar lower side during the fishing apparatus downwardly collapsed form; wherein the base member base-bar has a regular transverse width along the length thereof; wherein there are means for releaseably maintaining the selected angularity between the base-bar and the dual rails uprightable member, said means including a lug-plate located above the base-bar and pivotably attached to the rearward portion thereof adjacent to the pivotable connection between the base-bar and the respective rails, the width of said lug-plate being less than the regular transverse width of the base-bar whereby said pivotal lug-plate is locatable between the uprightable member rails when the fishing apparatus is in downwardly collapsed form; and wherein the said fishing line suspension means comprises a hook.

3. The fishing apparatus of claim 2 wherein the lever forward-arm is a lineal portion of regular cross-sectional shape and dimensional size along said lineal length, said lever-pivot extending transversely from one rail of the uprightable member toward the other rail whereby the lever medial-portion at the lever-pivot is disposed between said rails and forwardly of the transversely extending forward-restraint; wherein the slidable-weight is provided with an aperture therethrough having a cross-sectional size at least twice that of the lever forward-arm lineal portion whereby the slidable-weight loosely slidable surrounds said forward-arm;

wherein the lever forward-arm carries a counter-balance-weight fixedly positionable at a selected location along the length thereof whereby said counter-balance-weight remains at said selected fixed position during both stable conditions of the elongate lever; wherein there is a visual signal means removably attached to the lever rearward-arm; wherein there are means to resiliently urge the base-plate and the lug-plate toward the base member base-bar; and wherein there is a fishing line reel revolvably attached to an external side of an upright member rail, said reel being resiliently urged transversely away from said rail with a spring means.

4. The fishing apparatus of claim 1 wherein the lever forward-arm is a lineal portion of regular cross-sectional shape and dimensional size along said lineal length, said lever-pivot extending transversely from one rail portion of the uprightable member toward another co-parallel rail portion thereof whereby the lever-pivot is disposed between said rails; wherein the slidable weight is provided with an aperture therethrough having a cross-sectional size at least twice that of the lever forward-arm lineal portion whereby the slidable-weight loosely slidably surrounds said lever forward-arm; wherein the forward-restraint is carried by the dual rails uprightable member rearwardly of the lever-pivot; and wherein the said fishing line suspension means comprises a hook.

* * * * *